US009060029B2

(12) United States Patent
Amsterdamski

(10) Patent No.: US 9,060,029 B2
(45) Date of Patent: Jun. 16, 2015

(54) SYSTEM AND METHOD FOR TARGET PROFILING USING SOCIAL NETWORK ANALYSIS

(71) Applicant: Verint Systems Ltd., Herzliya Pituach (IL)

(72) Inventor: Lior Amsterdamski, Petach Tikva (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 65 days.

(21) Appl. No.: 13/663,403

(22) Filed: Oct. 29, 2012

(65) Prior Publication Data

US 2013/0151616 A1 Jun. 13, 2013

(51) Int. Cl.
*H04L 29/08* (2006.01)
*H04L 12/58* (2006.01)
*H04W 4/20* (2009.01)

(52) U.S. Cl.
CPC .............. *H04L 67/22* (2013.01); *H04L 51/32* (2013.01); *H04W 4/206* (2013.01)

(58) Field of Classification Search
CPC ............................... H04L 67/22; H04L 51/32
USPC .................... 709/203, 206, 217, 223, 224
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 2002/0052954 A1* | 5/2002 | Polizzi et al. | 709/225 |
| 2007/0156522 A1* | 7/2007 | Carpenter et al. | 705/14 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2009/0204599 A1* | 8/2009 | Morris et al. | 707/5 |
| 2010/0205179 A1* | 8/2010 | Carson et al. | 707/740 |
| 2011/0185020 A1* | 7/2011 | Ramamurthy et al. | 709/204 |

(Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Lashonda Jacobs
(74) *Attorney, Agent, or Firm* — Meunier Carlin & Curfman

(57) ABSTRACT

A profile or dossier of a user is constructed based partly on data culled from a data network that reveals indirect, network-mediated relationships with other individuals and groups. The profile is assembled from information, such as properties of a target individual to build an initial social circle of the target individual. References to the target individual can be derived from the direct and indirect associations in order to compile a dossier on the target individual from the references to the target individual. The initial social circle may be expanded by building respective new social circles having new associations by crawling a plurality of web sites, and deriving additional references to the target individual from the new associations in the new social circles. According to a further aspect of the method, compiling a dossier includes extracting metadata from the references.

20 Claims, 4 Drawing Sheets

(56) References Cited

U.S. PATENT DOCUMENTS

| | | | |
|---|---|---|---|
| 2011/0238516 A1* | 9/2011 | McAfee | 705/26.1 |
| 2011/0246574 A1* | 10/2011 | Lento et al. | 709/204 |
| 2011/0302144 A1* | 12/2011 | Hamilton et al. | 707/705 |
| 2012/0078938 A1* | 3/2012 | Davis et al. | 707/767 |
| 2012/0089590 A1* | 4/2012 | Osann, Jr. | 707/709 |
| 2012/0110096 A1* | 5/2012 | Smarr et al. | 709/206 |
| 2012/0239497 A1* | 9/2012 | Nuzzi | 705/14.53 |
| 2012/0246139 A1* | 9/2012 | Rao | 707/709 |
| 2012/0323909 A1* | 12/2012 | Behforooz et al. | 707/728 |
| 2012/0331405 A1* | 12/2012 | Eidelson et al. | 715/758 |
| 2013/0086057 A1* | 4/2013 | Harrington et al. | 707/732 |
| 2013/0124504 A1* | 5/2013 | Haugen et al. | 707/722 |
| 2013/0297619 A1* | 11/2013 | Chandrasekaran et al. | 707/748 |
| 2014/0195605 A1* | 7/2014 | Kallayil | 709/204 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

* cited by examiner

SYSTEM AND METHOD FOR TARGET PROFILING USING SOCIAL NETWORK ANALYSIS

BACKGROUND

1. Field of the Disclosure

This disclosure relates to data analysis. More particularly, this disclosure relates to construction of a dossier or profile of an individual based on data obtained via a data network.

2. Description of the Related Art

Several methods and systems for analyzing information extracted from the Internet are known in the art. Such methods and systems are used by a variety of organizations, such as intelligence, analysis, security, government and law enforcement agencies. For example, Verint® Systems Inc. (Melville, N.Y.) offers several web Intelligence (WEBINT) solutions that collect, analyze and present Internet content.

SUMMARY

One aspect of web intelligence (WEBINT) focuses on converting raw web data into unique operative insights that are an integral part of the intelligence cycle. One of the main challenges is to get the data in the first place, through regular harvesting of public information, or more complicated processes like those described below.

According to disclosed embodiments hereof, a profile or dossier of a user is constructed based partly on data culled from a data network that reveals indirect, network-mediated relationships with other individuals and groups.

There is provided according to embodiments of the disclosure a method of assembling information, which is carried out by identifying properties of a target individual, building an initial social circle of the target individual by crawling a plurality of web sites to identify direct and indirect associations thereof, deriving references to the target individual from the direct and indirect associations, and compiling a dossier on the target individual from the references to the target individual.

One aspect of the method includes expanding the initial social circle by building respective new social circles having new associations by crawling the plurality of web sites, and deriving additional references to the target individual from the new associations in the new social circles. Expanding the initial social circle and deriving additional references may be performed recursively based on the new associations.

According to one aspect of the method, deriving additional references recursively includes automatically determining a level of recursion.

According to an additional aspect of the method, compiling a dossier includes weighting the references to the target individual for correlation thereof According to a further aspect of the method, compiling a dossier includes extracting metadata from the references.

According to yet another aspect of the method, compiling a dossier includes correlating the references according to similarities and commonalities therebetween.

Still another aspect of the method includes extracting metadata from the references and correlating the references includes correlating the metadata.

According to an additional aspect of the method, building an initial social circle includes automatically generating leads to the target individual.

An aspect of the method includes determining candidates for the target individual, wherein the candidates lack accounts on the plurality of web sites.

A further aspect of the method includes applying an entity matching procedure to specify the target individual from among the candidates.

Other embodiments of the disclosure provide computer software product and apparatus for carrying out the above-described method.

BRIEF DESCRIPTION OF THE SEVERAL VIEWS OF THE DRAWINGS

For a better understanding of the disclosure, reference is made to the detailed description hereof, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles disclosed herein. It will be apparent to one skilled in the art, however, that not all these details are necessarily always needed for practicing the techniques disclosed herein. In this instance, well-known circuits, control logic, and the details of computer program instructions for conventional algorithms and processes have not been shown in detail in order not to obscure the general concepts unnecessarily.

Aspects of the disclosure may be embodied in software programming code, which is typically maintained in permanent storage, such as a computer readable medium. In a client/server environment, such software programming code may be stored on a client or a server. The software programming code may be embodied on any of a variety of known non-transitory media for use with a data processing system, such as a diskette, hard drive, electronic media or CD-ROM. The code may be distributed on such media, or may be distributed to users from the memory or storage of one computer system over a network of some type to storage devices on other computer systems for use by users of such other systems.

System Overview

Figure 1:
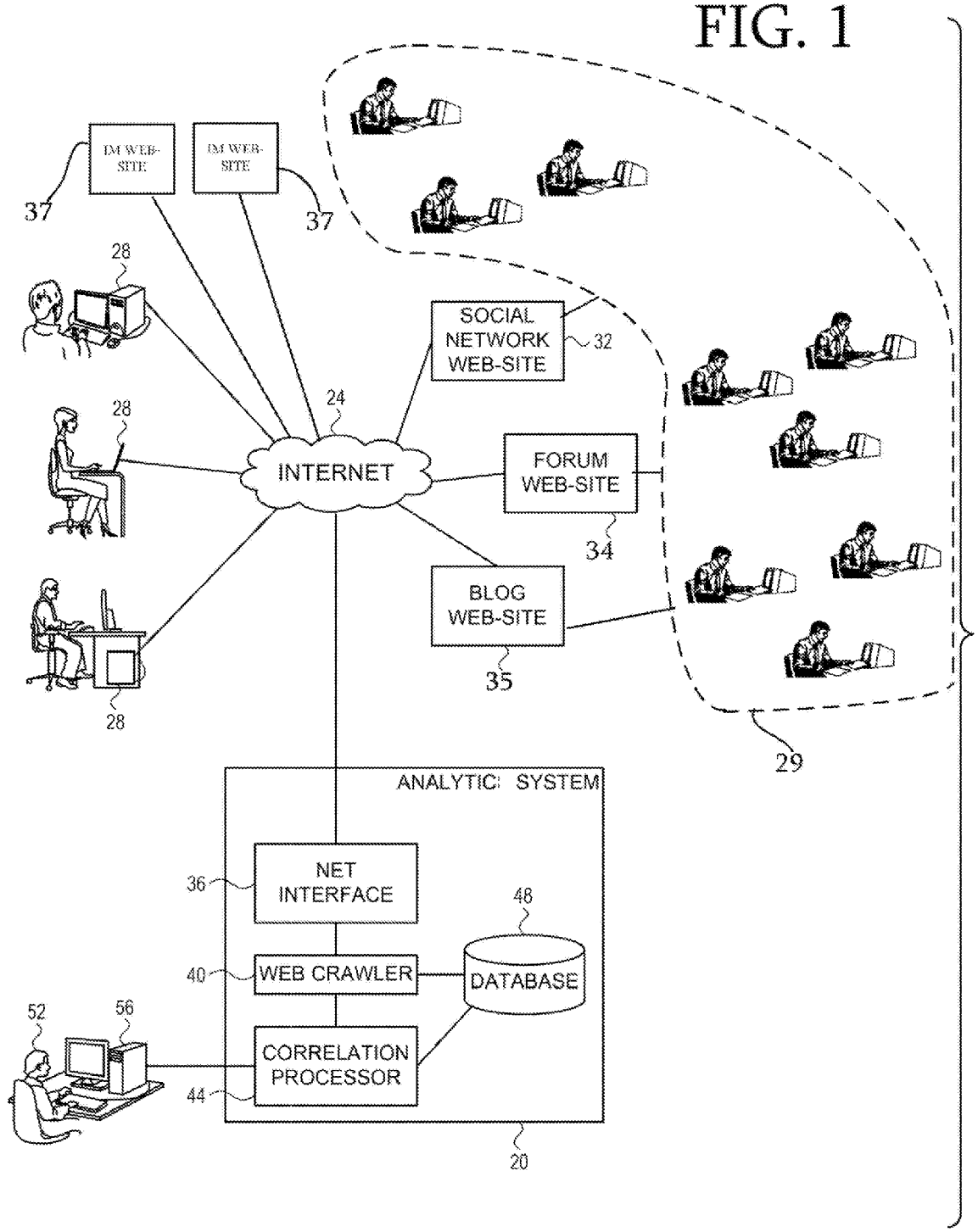
FIG. 1 is a block diagram that schematically illustrates an analytic system, in accordance with an embodiment of the present disclosure.

Turning now to the drawings, reference is initially made to FIG. 1, which is a block diagram that schematically illustrates an analytic system 20, in accordance with an embodiment of the present disclosure. The system 20 typically comprises a general purpose or embedded computer processor, which is programmed with suitable software for carrying out the functions described hereinbelow. Thus, although portions of the system 20 shown in FIG. 1 and other drawing figures herein are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors. The software may be provided to the processor or processors on tangible, non-transitory media, such as CD-ROM or non-volatile memory. Alternatively or additionally, the system may comprise a digital signal processor or hard-wired logic.

The system 20 is connected to a wide-area network 24 (WAN), which is typically the Internet, in order to carry out web intelligence and other analytic functions. The system 20 can be used, for example, by various intelligence, analysis, security, government and law enforcement organizations.

Via network 24, users 28 post content on any number of web sites, shown representatively as social network web site 32, forum web site 34, and blog web site 35 For example, users may post web pages on blogs and social network sites, interact with one another using Instant Messaging (IM) web sites 37, post threads on web forums, respond to news articles using talkback messages, or post various other kinds of data items. A group 29 comprising any number of other users may also post items on the web sites 32, 34, 35 in many combinations. In general very few details of the users 28 are known. However, by analysis of the postings by the group 29 and direct or indirect references to various ones of the users 28, it is possible to develop details concerning selected users 28 and to construct profiles or dossiers thereon. When feasible, interception of non-open source IM traffic could provide still further details regarding the target individual.

The embodiments described herein are mainly concerned with social media such as social networks, forums, blogs, instant messaging (IM) and on-line comments to newspaper articles, but the disclosed techniques can also be used in any other suitable types of web site. Generally, the methods and systems described herein can be used with any web site that allows users to annotate the web site content (e.g., comment or rate content) and/or to interact with one another in relation to the web site content. Web sites may implement these features using various tools, such as "Google Friend™ Connect" or "Facebook™ Connect." As another example, web-based e-mail sites often support social network capabilities, such as "Yahoo! Updates" or "Google Buzz." As yet another example, on-line storage services such as "Windows Live Skydrive" allow users to upload, annotate and share files. Web sites such as Picassa and Flickr® allow users to upload, annotate and share image albums.

Other web sites offer niche social networks, for users having special interests such as music, movie reviews and ratings. On-line billboards and e-commerce web sites allow users to upload content and personal profiles, annotate uploaded content, and provide ratings and comments. Web-based e-mail sites allow users to upload contact lists and details. Other exemplary types of web sites are on-line dating services, and payment authentication services such as PayPal. Further alternatively, the disclosed techniques can be used with any web site that allows users to sign in and upload data items. Some web sites, e.g., the Internet Movie Databases (IMDb) implement social network capabilities using proprietary technology. Other web sites use third-party tools such as Loopt® location presence software.

Typically, a user identifies himself on a given web site using some identifier. An identifier may comprise, for example, a username or a nickname. In some web sites, users sign in using their e-mail addresses in combination with a site-specific password, in which case the e-mail address serves as the identifier. In some cases, e.g., in some location-based services, users identify on a web site using their telephone numbers as identifiers. As another example, some web sites use a third-party application (e.g., Facebook) in order to identify users and allow access to personal information such as friend lists and profile images.

As yet another example, some web sites allow users to claim vanity Uniform Resource Locators (URLs). A vanity URL in combination with a username or e-mail address is sometimes used for authentication. With web sites of this sort, a vanity URL can be regarded as an identifier. Some web sites, e.g., OpenID, users may validate themselves through a third-party URL as an identifier. In most web sites, the user selects a user identifier when registering with the web site and the user identifier appears in the data items posted by the user on that site.

It is very common for users to employ different user identifiers on different web sites. The use of multiple identifiers may be innocent or hostile. Innocent users may use different identifiers for privacy, for style or for any other reason. Hostile users, such as criminals or terrorists, may use different identifiers as aliases in order to evade surveillance. The system 20 applies various criteria for detecting and identifying aliases of an individual participating in different web sites.

The system 20 comprises a network interface 36 for communicating with network 24. A web crawler 40 crawls web sites 32, 34, 35, 37 and retrieves data items that were posted on by users 28. Data items may comprise, for example, social network or blog posts, forum or IM messages, talkback responses and/or any other types of data items. Each retrieved data item was posted on a certain web site 32 by a certain user 28, and comprises an identifier that is associated with that user. Data items that were posted by the same user 28 on different web sites 32, however, may comprise different user identifiers.

A correlation processor 44 extracts user identifiers from retrieved data items, and correlates the user identifiers from different web sites using methods that are described further below. Typically, correlation processor 44 identifies two or more user identifiers that belong to a given user and creates a unified identity, which comprises the user identifiers and may comprise other information pertaining to the user.

Web crawler 40 and correlation processor 44 store retrieved data items, extracted identifiers, unified identities and/or any other relevant information in a database 48. Database 48 may comprise any suitable storage device, such as one or more magnetic disks or solid-state memory devices, and may hold the information in any suitable data structure. In some embodiments, correlation processor 44 extracts from the retrieved data items personal information regarding users 28, and stores the personal information in database 48 as part of the users' unified identities. Personal information may comprise, for example, e-mail addresses, physical addresses, telephone numbers, dates of birth, and photographs.

Information extracted from the retrieved data items can be stored in database 48 using various types of data structures. In an embodiment, the data is stored in a hierarchical data structure, which enables straightforward access and analysis of the information. For example, when extracting information from a forum discussion, the data structure may comprise a table listing the threads appearing in the forum. A related table may list the content and responses of users in each thread. In an embodiment, the data structure enables uniform storage of information that was gathered from multiple different types of web sites, e.g., forums and social networks. The data structure may comprise a centralized table of users, which holds user information such as e-mail addresses, user identifiers and photographs, gathered from multiple web sites. In an embodiment, the database enables storage and retrieval of textual information as well as binary information (e.g., images and attached documents). In an embodiment, the data structure is implemented using Structured Query Language (SQL).

The system 20 presents the unified identities and any other relevant information to an operator 52 (typically an analyst) using an operator terminal 56. Operator terminal 56 comprises suitable input and output devices for presenting information to operator 52 and for allowing the operator 52 to manipulate the information and otherwise control system 20. For example, the operator 52 may access the entire body of data items posted by a given user, including data items that were retrieved from multiple web sites and have multiple user identifiers. By jointly accessing all the content associated with the given user, gathered from multiple social media web sites, the analyst is able to track the network activity of the user in question.

In some embodiments, web crawler 40 crawls a predefined list of social media web sites that are of interest. In an example embodiment, the web crawler 40 is provided with a crawling template, or data mining template, for each web site or for each type of web site. The template defines the logic and criteria for retrieving data items, for extracting user identifiers from data items, and for identifying additional information in the data items that assists in identifier correlation.

Typically, system 20 retrieves data items, extracts and correlates user identifiers in a data-centric manner, i.e., without focusing a priori on any specific target users. The output of such a process is a database of unified identities, each comprising a set of user identifiers and other information related to a respective user. An analyst may query this database when the need arises. For example, when one identifier of a certain target user is known, the database can be queried in order to find other identifiers that are used by the target user, and thus access additional web content posted by that user on other web sites. In alternative embodiments, however, system 20 may operate in a target-centric manner, i.e., focus on data items and identifiers belonging to specific target users. Unification of user identifiers may be achieved using the teachings of copending U.S. application Ser. No. 13/187,438, filed Jul. 21, 2011 entitled "System and Method for Unification of User Identifiers in Web Harvesting", which is herein incorporated by reference.

In some embodiments, web crawler 40 crawls data items that are not normally accessible to search engines, such as data items that normally require human data entry for access (e.g., entry of user credentials, checking of a check box, selection from a list, or entry of a query that causes generation of the data item on-demand).

The system configuration shown in FIG. 1 is an exemplary configuration, which is chosen purely for the sake of conceptual clarity. In alternative embodiments, any other suitable system configuration can be used. For example, the system may comprise two or more web crawlers instead of one web crawler 40 and correlation processor 44 may be implemented on a single computing platform. In some embodiments, system 20 may carry out additional WEBINT and/or analytic functions. Typically, web crawler 40 and/or correlation processor 44 comprise general-purpose computers, which are programmed in software to carry out the functions described herein.

Automatic Dossier Construction.

Unlike traditional open source intelligence (OSINT), WEBINT according to an embodiment of the disclosure exploits "public limited information,", i.e., information that is visible via a regular browser and is not part of a private communication as in chat, but is nevertheless displayed only to a limited, generally predefined group of individuals, e.g., on a social networking site. Additionally, according to an embodiment of the disclosure, WEBINT attempts to compile information relating to individuals who refrain entirely from opening social networking accounts. This presents an even greater challenge.

One aspect of social networks today is a trend in the ability of a subscriber (sometimes referred to herein as a "user") to control what portions of his profile are displayed, and to whom. This trend has resulted in high configurability of social network accounts, allowing subscribers to limit almost any aspect of their public profiles, including friend lists, posts, and even the profile image itself In addition, social networks have simplified the management of friend lists in a way that has increased the scope of profile exposure, even achieving a granularity of individual posts and photos. Such privacy enhancements obviously complicate the task of assembling information on a target individual. The term "friend" as applied to on-line relationships comprehends a minimal connection, such as social acquaintanceship, or membership in a class or society. It does not necessarily imply a relationship of affection or trust.

One method of compiling a dossier on a target individual, whether or not he has a personal presence on a particular network site, relies on "indirect internet appearances". These are references to the target individual by others. For example, social networks may allow the target individual to be designated as a friend of a subscriber. This designation permits the subscriber to upload various information regarding the target individual, including identifying his physical location, mentioning his name in postings to the site, and uploading pictures in which the target individual appears. Even if the target individual subscribes to the web site, but has caused his profile to be blocked, his friends' profiles may nevertheless be visible and contain data of interest relating to the target individual.

Indeed, even in cases where the target individual has no direct connection to the web site whatsoever, he may nevertheless be included in a social circle that overlaps with a group of mutual friends on the web site, and he may accordingly be referred to in communications among that group of friends. Additionally the target individual may be active on other web sites, which may have shared links with those of the friends. So long as the privacy settings of the friends permit, such information may be collected and provide useful leads regarding the target individual.

Figure 2:
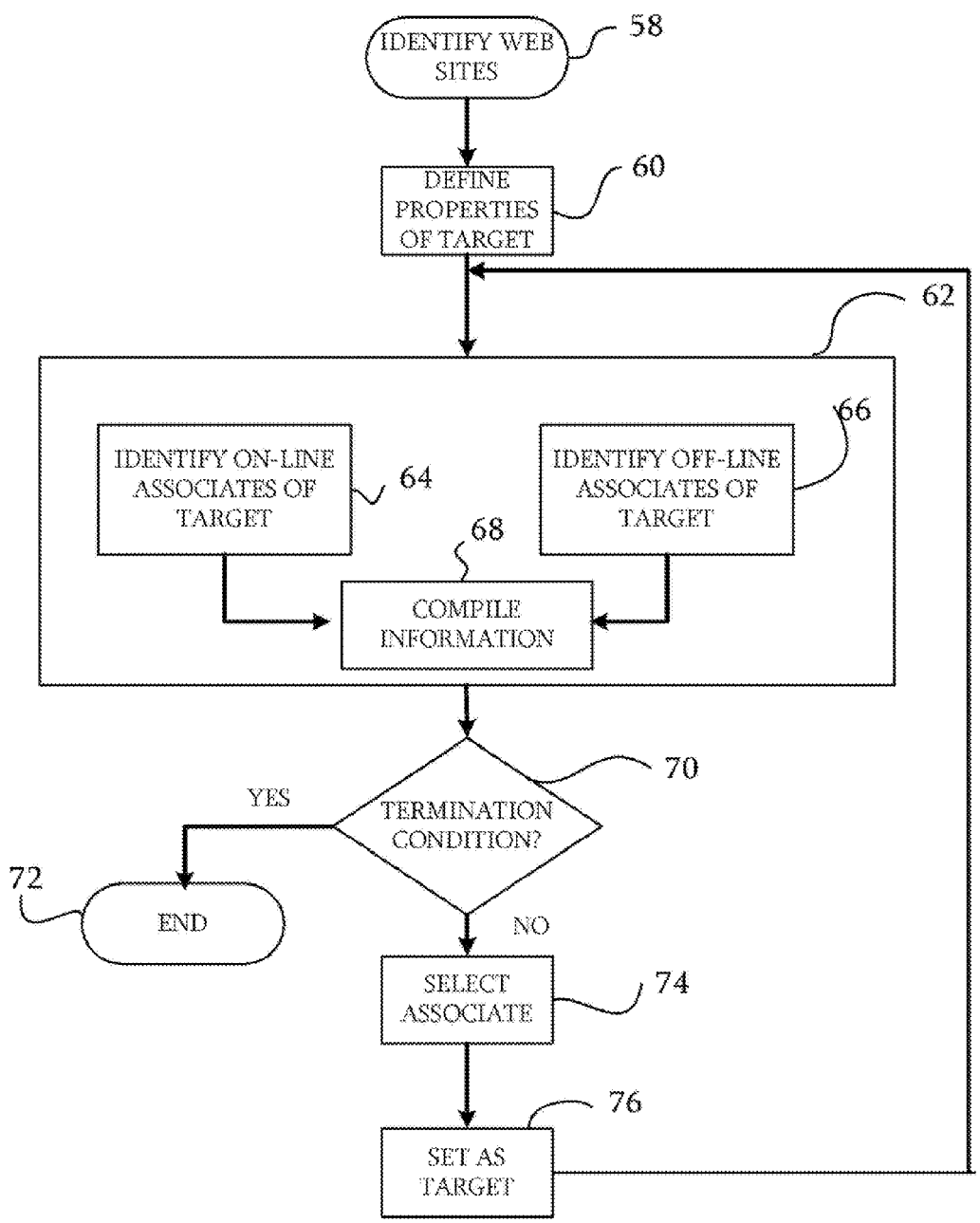
FIG. 2 is a flow chart of a method of constructing a dossier of an individual according to an embodiment of the present disclosure.

Reference is now made to FIG. 2, which is a flow chart of a method of constructing a dossier of an individual according to an embodiment hereof The process steps are shown in a particular linear sequence in FIG. 2 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process. The method may be performed automatically, using a suitably programmed computing device connected to the internet or other data network, with minimal or no operator assistance.

At initial step 58 a list of web sites is prepared, e.g., web sites 32, 34 35 37 (FIG. 1). The list may include any publically declared web sites belonging to or maintained by the target individual. However, generally these do not exist.

Next, at step 60 a list of relevant properties of the target individual is prepared. The list may include his nickname(s), picture, birthplace, etc. It is notable that more than one nickname may be applicable to respective accounts on a given web site, or to accounts on different web sites. All the nicknames are useful for aggregating lists of on-line friends of the target individual and identifying any physical locations with which he may be associated. Information developed in step 60 constitutes "leads" to the target individual that can be exploited when there is limited information about the target individual, as explained below. It is desirable that the system interface, typically a wizard, simplifies lead definition and entry. The requisite technical knowledge and expertise required from the operator can thus be minimized. Typically, the wizard facilitates account inputs, and automatically aids the process by offering suggestions based on both raw data and operator inputs. The system is adapted, cooperatively with the wizard, to expose initial leads automatically, and optimize expansion of the leads to encompass the target individual's on-line and off-line social circles.

Next, at step 62 the social circles of the target individual are constructed. Step 62 includes steps 64, 66, 68.

In step 64 the list prepared in initial step 58 is scanned to determine if the target individual has a public presence thereon to identify on-line friends of the target individual. This is a first phase of constructing a social circle of the target individual.

Next, at step 66, in a second phase, the social circles of the target individual are augmented by identifying relationships outside the on-line environment to identify off-line associates of the target individual. The information derived from both of steps 64, 66 may be memorized, for example in a relational database. The off-line relationships may include, for example, organizational memberships, present and historical academic associations, career associations, and avocational groups. Off-line relationships and indirect affiliations with other individuals belonging to such groups and organizations represent fertile ground for discovering new information about the target individual. On-line references to off-line groups, if available, are aggregated including social website participation, network profiles and friends list of the other individuals.

In step 68 any references to the original target individual derived from the on-line and off-line associations identified in steps 64, 66 are compiled and correlated. In one embodiment, the correlation processor 44 (FIG. 1) assigns to each information item a weight or score suggesting the likelihood that this is a reference to the target individual. For example, a friend link to a unique URL receives a high weight. In another example, a tag in a picture with a name, but not associated with a link would be assigned a relatively low weight. Determining a likelihood that an information item is related to the target individual may be accomplished using any of the methods taught in the above-noted U.S. application Ser. No. 13/187,438, including extracting metadata from the information items, and correlating the information items according to similarities and commonalities therebetween. In general a higher weight is given to entities downloaded automatically from a profile, compared with entities entered by an operator.

Next, the relationships discovered in step 62 are optionally expanded by recursive investigation. It should be understood that the principles of the method are explained with reference to recursion by way of example and not of limitation. Embodiments of the method that avoid recursion may be implemented using techniques well-known in the computer programming art.

The process attempts to recognize new social circles as a high priority. Once a circle is established (three or more friends mutually connected) the system tries to expand the circle in order to increase the amount of data that can be extracted from it. In particular, there is a relatively high priority given to expanding social circles that have already provided posts, pictures, etc., as compared with social circles who have only resulted in friend connections. Optimization of the expansion process also accords relatively high priority to certain types of affiliation, e.g., siblings (compared to biologically unrelated users), users who had an actual interaction with the target individual, users who had interactions determined to be "strong"

At decision step 70 it is determined whether associates of the target individual remain to be evaluated or whether some other termination condition has occurred, for example, a predetermined level of recursion, exhaustion of identified on-line and off-line associates, or expiration of a predetermined time interval. If so, the procedure ends at final step 72.

Otherwise, an associate of the target individual is selected at step 74 and treated as the target individual in step 76 for purposes of iterating step 62. The on-line presence and social circle of the individual selected in step 76 are recursively investigated by iterating step 62. It will be apparent that a large cluster of individuals having possible relationships to the original target individual may be identified, which improves the likelihood of discovering information related to the target individual that can be included in his dossier.

The determination of a level of recursion is established by considering the information uncovered in the first performance of step 62. For example, if sufficiently rich information regarding the target individual is obtained, then there may be no need to download "friends of friends", and the recursion level may be set accordingly to zero. In general the recursion level may be set by the operator. Alternatively, incremental information obtained at each recursion level may be evaluated, e.g., by counting references to the target individual, or by another suitable metric. When the metric falls below a predefined threshold of significance recursion may be terminated. Further alternatively, when recursion may be terminated when usage of computer or network resources exceeds a threshold level.

Moreover, in order to optimize the method, the extent of investigation in step 62 may be automatically limited responsively to the nature of information uncovered. The following examples illustrate this issue. Many combinations based on the examples presented below are possible. In all cases the system detects the situation as it appears after the first iteration of step 62, and reacts accordingly.

EXAMPLE 1

In the first iteration of step 62, assume that only friends of the target individual on a social web site are available:

In the second iteration, scan the list of such friends to obtain posts to the web site and pictures.

Further iteration is optional.

EXAMPLE 2

In the first iteration of step 62, assume that only the user information sometimes referred to herein as a "wall" is open. As used herein the term "wall" refers to a feed of information that is either published by a user, or by his social circle, either as a post, or a post that is related to him and automatically appears on his feed as well. It can consist from status feeds, pictures, events, links, and other social activity. It is the user's social activity aggregated from an entire social network, including other online sites.

Get all posts and for each post:
i. Get account.
ii. Generate relation between target individual and the user providing or receiving the post.

iii. If a picture or video is available,
1. Get tagged users. As used herein, a "tagged user" is an individual identified by a link in a social object, e.g., a post, event, note, picture or video.
2. Generate a relation between target and other users tagged inside the same photo using the techniques disclosed in the above-referenced U.S. application Ser. No. 13/187,438.
3. Further recursion is optional.

EXAMPLE 3

In the first iteration of step 62, assume that only the category "photos/video" is open.

Get all photos of the target individual and all photos where the target individual was tagged. Then for each photo/video:
i. Get all tagged users.
ii. Get all users who wrote a comment on the photo/video.
iii. Generate relation between target and other users identified in steps (i) and (ii).
tagged inside the same photo.

As before, further recursion is optional. In order to conserve resources, only names or other references need be downloaded, rather than the entire data.

EXAMPLE 4

In the first iteration of step 62, assume that the profile of the target individual is closed, i.e., unavailable to the public.

Use leads developed in step 60 (FIG. 2) to find other profiles and search for references to target individual within the other profiles.

Iteration is optional.
Alternative Embodiment

Essentially, a method according to this embodiment method involves addition of a "context-social" entity matching mechanism to procedure of FIG. 2, in which scores are assigned to entities having no identifiable account.

In addition to using regular identifiers for cross matching, the system attempts to unify similar named entities according to social circles. For example, although there may be many individuals named "David", within a social circle there is usually at least one such individual who lacks have an account on the list of web sites. Such individuals are referred to herein as "ghosts". Profiles, referred to herein as "ghost profiles" are compiled on such ghosts. Subscribers referring to the ghosts are treated as friends. The ghosts may be tracked by the system using a group DIP, including nicknames, and references in posts, photos and emails when available. The GUI may highlight ghost profiles according in the Group DIP, and in a target DIP. This may result in the exposure of people of interest who are friends of the ghost in the real world, but who lack have a social networking account. Thus, while the target lacks a social network account, others have a social network account and mention the target in their feeds.

Figure 3:
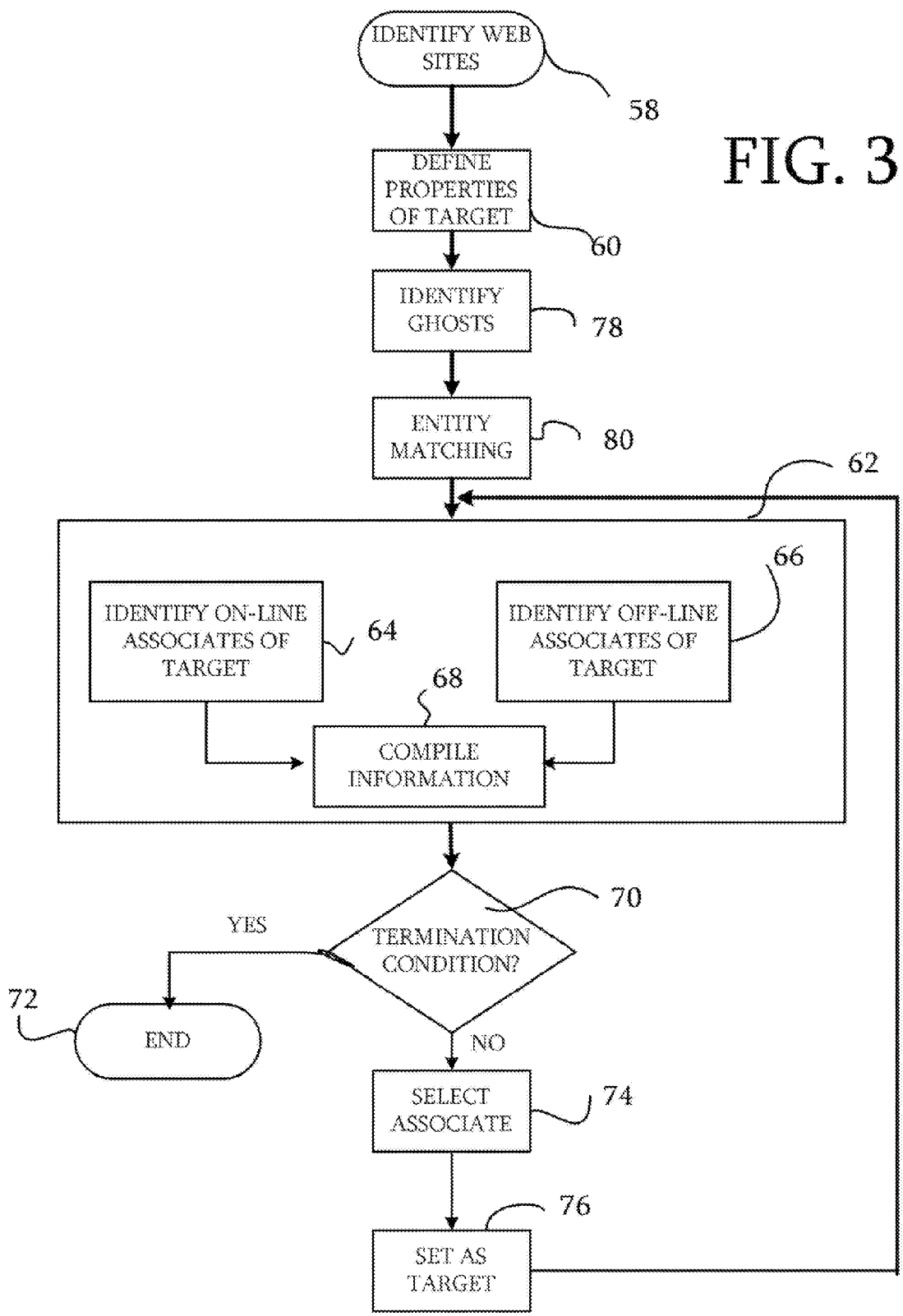
FIG. 3 is a flow chart of a method of constructing a dossier of an individual lacking an explicit presence on a web site according to an alternate embodiment of the present disclosure.

Reference is now made to FIG. 3, which is method of constructing a dossier of an individual lacking an explicit presence on a web site, e.g., a social networking site, according to an alternate embodiment of the present disclosure. The discussion of process steps that are identical to steps in FIG. 2 are not repeated in the interest of brevity.

After performing step 60, a ghost target individual is identified in step 78, details of which are presented below. This may result in identification of individuals other than the intended target individual. To unify references and eliminate such false positive identifications, an entity-matching procedure is carried out in step 80. The entity matching procedure disclosed in the above-noted U.S. application Ser. No. 13/187,438 may be used.

Figure 4:
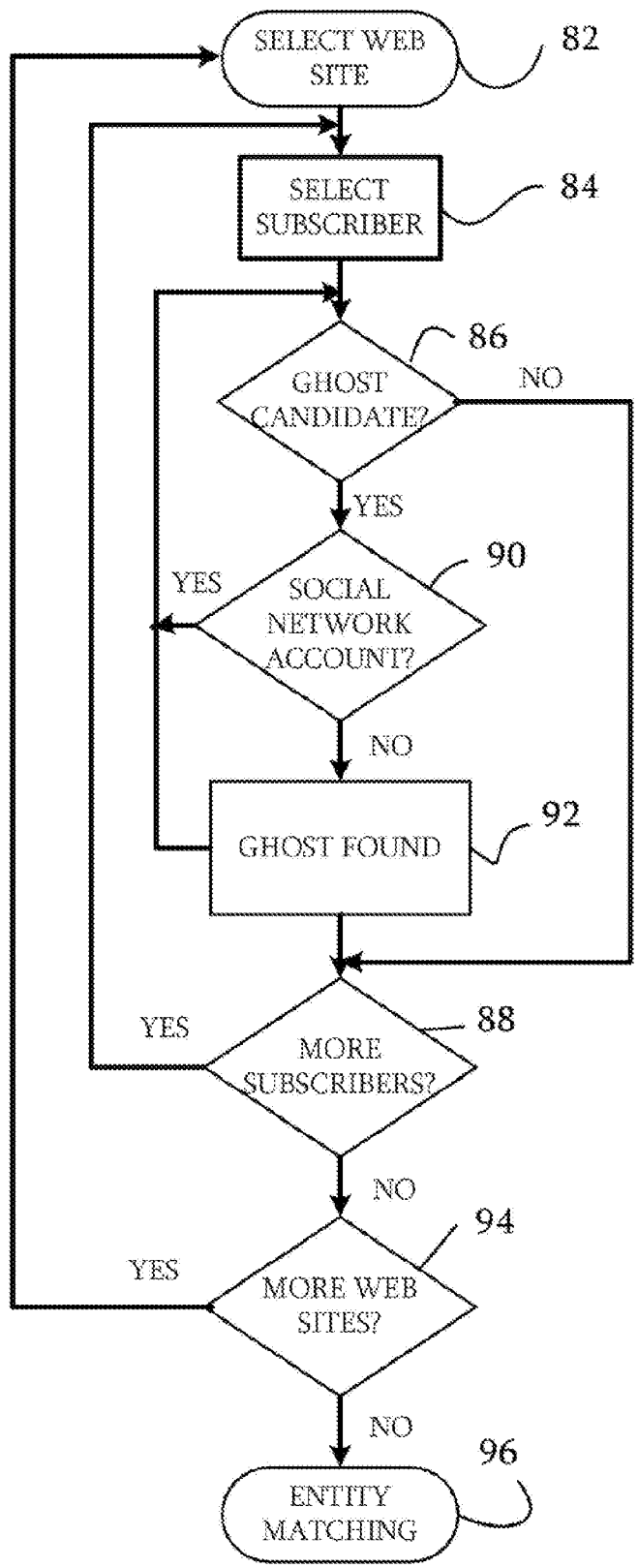
FIG. 4 is a flow chart of a method of identifying a ghost target individual in accordance with an embodiment of the disclosure.

Reference is now made to FIG. 4 which is a flow chart of a method of identifying a ghost target individual in accordance with an embodiment of the disclosure.

The web sites listed in initial step 58 are scanned for references to an individual having properties identified in step 60 (FIG. 3), referred to hereinbelow as "target properties". In initial step 82 a web site is selected.

Next, at step 84 a subscriber of the current site is selected.

Control now proceeds to decision step 86, where it is determined if a reference to a candidate having the target properties. If the determination at negative, then control proceeds to decision step 88, which is described below.

If the determination at decision step 86 is affirmative, then control proceeds to decision step 90, where it is determined if the candidate has a social networking account. This may be done by scanning the list of web sites listed in initial step 58. If the determination at decision step 86 is affirmative, then it is concluded that the candidate is not a ghost, and is therefore ignored. Control returns to decision step 86 to see if the current subscriber has referred to more candidates.

If the determination at decision step 90 is negative, then a ghost has been identified. Control proceeds to step 92, in which details of the ghost and the current subscriber are recorded for later use in an entity matching procedure.

Control now proceeds to decision step 88, where it is determined if there are more subscribers to evaluate in the current web site. If the determination at decision step 88 is affirmative, then control returns to step 84.

If the determination at decision step 88 is negative, then control proceeds to decision step 94, where it is determined if more web sites remain to be evaluated. If the determination at decision step 94 is affirmative, then control returns to initial step 82.

If the determination at decision step 94 is negative, then control proceeds to final step 96. The procedure ends. The data accumulated in step 92 is available for entity matching as described above.
Implementation Details.

This section details construction and operation of a wizard that implements step 60 (FIG. 2).

The user flow is be divided into three parts:
First part: initial leads (using Wizard).

The goal of the first part is to retrieve leads, either by requesting the operator to add accounts manually, or by offering recommendations for possible users and groups that might be used as initial leads to the target individual, and requesting the operator to approve them. Afterwards, the operator clicks "reconstruct life", and the process runs independently, based on the inputs and other automatically developed leads that the system obtains, for example: downloading the target's public wall, and using 20 friends as initial leads).

The following steps are conducted automatically (though reflected to the user via a graphical user interface (GUI). The operator is not asked to intervene until the profile of the target individual is assembled.

The operator can supply the following Inputs:
Manual inputs: In order to reach the leads, an input wizard is displayed to the operator. The latter allows the user to supply leads (in the form of accounts) of groups, or people, which might be connected to the target individual.

Operator-assisted inputs. In order to ease the process, this portion of the wizard already contains a list of automatically detected relevant groups. This can be achieved according to one of the following options:

Groups that have appeared in the target individual's public profile and are under the categories: employer or school.

Groups that have appeared in his public profile other than school or employer, but have fewer than a predetermined number, e.g., 100 friends, suggesting that they are not general fan pages, but are conveying his real world interests and social life.

Suggested groups that have previously been recognized and are relevant to known information concerning the target individual, e.g., work place. For example: the operator (or an investigator) has entered "Latin Kings," and the system automatically fetches relevant groups from Facebook. In this example URLs themselves (accounts) are not directly available. Rather they are derived from inputs from the operator that resulted in suggested groups. Some are relatively more relevant than others, and may be highlighted in the GUI, and subsequently improved in the future through a "group matching" mechanism, based on social context.

User accounts that are were downloaded and recognized as connected to the target individual, either from the target's profile itself. For example, he may have listed them on his friend lists, as siblings, or from another account already existing in the database.

Suggested accounts (similar to suggested groups) based on names entered by the investigator that are auto-refreshed using an application programming interface (API) and allow an operator-assisted choice of the relevant ones, e.g., via a dynamic combo box in the GUI. To that end, an entity matching mechanism as described in the above-reference U.S. application Ser. No. 13/187,438 may be applied.

The GUI is designed to encourage the investigator to add users rather than groups, since they are the goal of the initial process.

Additionally or alternatively, the system may generate leads independently, without consulting with the user. This may be achieved by use of the publicly available data in the target individual's account. For example, if the wall is open, it would download the users who published posts on the wall, and use them in order to search for the "first 10 leads" since there is a relatively large likelihood that they are friends of the target individual. Further additionally or alternatively information regarding the target individual may be found by correlating other targets with properties of the current target individual, for example by finding a link based on common context, and applying the entity-matching process based on the other targets.

Second part: searching.

The system displays the search process to the user and alert him on its progress. The GUI focuses on the following steps:

Searching the initial definitive friends in order to start the iterative process that builds the target individual's social circles.

Expanding the social circle through an iterative process, based on the 10 accounts recognized in the step above. This may be achieved by displaying real data, e.g., by drawing a dynamic diagram of the target individual's social circle during its construction, showing his friends and their mutual connections.

Reconstructing target individual's life through his social circle by recognizing events published on public accounts, and connecting them to target individual's profile page in the system: posts, likes, groups, pictures, etc, that were found during the process.

After lead gathering, the system starts an iterative process in order to reach some predetermined number of friends, e.g., 10 friends, that allows initiation of another iterative process that generates the social circle, followed by a "insertion" step in which entity matching analysis is conducted in order to determine what portions of friends activity include the target. Typically the system does not request 10 leads. Rather It asks via the wizard for whatever leads are possible and then tries to achieve 10 initial leads automatically, based on the operator-provided leads and leads gathered automatically.

Third step.

The system alerts the operator that a target individual's life has been reconstructed. It allows him to jump to a dynamic investigation page (DIP), which is an internally maintained profile of the target individual. The system, and highlights via notifications the new relevant data that has been unveiled.

At this point, the system may pause until a user actively intervenes, in order to improve performance.

If the process stops, clicking again on "reconstruct the targets life" for a target that was already reconstructed results in a notification that the system will expand the target individual's social circles even more, and will restart without requesting leads again.

The process stops automatically when:

It consumes a predetermined amount of resources without results for a time interval, e.g., a full day.

It found a predetermined amount of data deemed relevant according to some criterion.

Operator roles.

In case the system was unable to retrieve the first 10 leads, or compensate and build an acceptable social circle from a limited number of leads, it alerts the operator and ask for more input.

It will be appreciated by persons skilled in the art that the present disclosure is not limited to what has been particularly shown and described hereinabove. Rather, the scope of the disclosure includes both combinations and sub-combinations of the various features described hereinabove, as well as variations and modifications thereof that are not in the prior art, which would occur to persons skilled in the art upon reading the foregoing description.

The invention claimed is:

1. A method of assembling information, comprising the steps of:
   identifying properties of a target individual, comprising using a correlation processor to extract user identifiers from retrieved data items, and correlating the user identifiers from different web sites, thereby identifying properties of a target individual;
   building an initial social circle of the target individual by crawling a plurality of web sites from different social media providers to identify direct and indirect associations between users of the social media providers and the target individual, wherein the target individual has no direct connection with least one of the social media providers;
   deriving references to the target individual from the direct and indirect associations; and
   compiling a dossier on the target individual from the references to the target individual.

2. The method according to claim 1, further comprising the steps of:
   expanding the initial social circle by building respective new social circles having new associations by crawling the plurality of web sites; and
   deriving additional references to the target individual from the new associations in the new social circles.

3. The method according to claim 2, further comprising the steps of expanding the initial social circle and deriving additional references recursively based on the new associations.

4. The method according to claim 1, wherein compiling a dossier comprises weighting the references to the target individual for correlation thereof 5. The method according to claim 1, wherein compiling a dossier comprises extracting metadata from the references.

6. The method according to claim 1, wherein compiling a dossier comprises correlating the references according to similarities and commonalities therebetween.

7. The method according to claim 6, further comprising extracting metadata from the references and correlating the references comprises correlating the metadata.

8. The method according to claim 1, further comprising the step of determining candidates for the target individual, wherein the candidates lack accounts on the plurality of web sites.

9. The method according to claim 8, further comprising the step of applying an entity matching procedure to specify the target individual from among the candidates.

10. A computer software product, including a non-transitory computer-readable storage medium in which computer program instructions are stored, which instructions, when executed by a computer, cause the computer to perform the steps of:
    identifying properties of a target individual, wherein a correlation processor extracts user identifiers from retrieved data items, and correlates the user identifiers from different web sites;
    building an initial social circle of the target individual by crawling a plurality of web sites from different social media providers to identify direct and indirect associations between users of the social media providers and the target individual, wherein the target individual has no direct connection with at least one of the social media providers;
    deriving references to the target individual from the direct and indirect associations; and
    compiling a dossier on the target individual from the references to the target individual.

11. The computer software product according to claim 10, wherein the instructions cause the computer to perform the additional steps of:
    expanding the initial social circle by building respective new social circles having new associations by crawling the plurality of web sites; and
    deriving additional references to the target individual from the new associations in the new social circles.

12. The computer software product according to claim 11, further comprising performing the steps of expanding the initial social circle and deriving additional references recursively based on the new associations.

13. The computer software product according to claim 12, wherein deriving additional references recursively comprises automatically determining a level of recursion.

14. The computer software product according to claim 10, wherein compiling a dossier comprises weighting the references to the target individual for correlation thereof.

15. The computer software product according to claim 10, wherein compiling a dossier comprises correlating the references according to similarities and commonalities therebetween.

16. The computer software product according to claim 15, further comprising extracting metadata from the references and correlating the references comprises correlating the metadata.

17. The computer software product according to claim 10, further comprising the step of determining candidates for the target individual, wherein the candidates lack accounts on the plurality of web sites.

18. The computer software product according to claim 17, further comprising the step of applying an entity matching procedure to specify the target individual from among the candidates.

19. A data processing system, comprising:
    a processor;
    a memory accessible to the processor storing programs and data objects therein, the programs including a wizard, wherein execution of the programs cause the processor to perform the steps of:
    using the wizard for identifying properties of a target individual, comprising using a correlation processor to extract user identifiers from retrieved data items, and correlating the user identifiers from different web sites, thereby identifying properties of a target individual;
    building an initial social circle of the target individual by crawling a plurality of web sites from different social media providers to identify direct and indirect associations between users of the social media providers and the target individual, wherein the target individual has no direct connection with at least one of the social media providers;
    deriving references to the target individual from the direct and indirect associations; and
    compiling a dossier on the target individual from the references to the target individual.

20. The data processing system according to claim 19, wherein execution of the programs cause the processor to perform the additional steps of:
    expanding the initial social circle by building respective new social circles having new associations by crawling the plurality of web sites; and
    deriving additional references to the target individual from the new associations in the new social circles.

* * * * *